United States Patent
Woo et al.

(10) Patent No.: US 10,693,151 B2
(45) Date of Patent: Jun. 23, 2020

(54) BIPOLAR PLATE FOR FUEL CELL HAVING CONTROLLED STRUCTURE OF CARBON MATERIALS AND METHOD OF MANUFACTURING THE SAME

(71) Applicant: Morgan Co., Ltd., Daegu (KR)

(72) Inventors: Jong Seok Woo, Daegu (KR); Mun Hee Lee, Daegu (KR); Hong Beom Ju, Daegu (KR); Kwang Sang Park, Daegu (KR); Sung Hoon Park, Seoul (KR)

(73) Assignee: Morgan Co., Ltd. (KR)

( * ) Notice: Subject to any disclaimer, the term of this patent is extended or adjusted under 35 U.S.C. 154(b) by 264 days.

(21) Appl. No.: 15/942,949

(22) Filed: Apr. 2, 2018

(65) Prior Publication Data
US 2018/0358630 A1    Dec. 13, 2018

(30) Foreign Application Priority Data
Jun. 12, 2017    (KR) .................. 10-2017-0073346

(51) Int. Cl.
*H01M 8/0226*    (2016.01)
*H01M 8/0213*    (2016.01)
(Continued)

(52) U.S. Cl.
CPC .......... *H01M 8/0226* (2013.01); *B29C 43/00* (2013.01); *B29C 48/022* (2019.02);
(Continued)

(58) Field of Classification Search
CPC combination set(s) only.
See application file for complete search history.

(56) References Cited

U.S. PATENT DOCUMENTS 6,379,795 B1 *  4/2002  Bisaria ............... B29C 45/0013
                                                         264/257
6,572,997 B1 *  6/2003  Iqbal ..................... B82Y 30/00
                                                         252/502
(Continued)

FOREIGN PATENT DOCUMENTS

CN      103117397 B     3/2015
JP        4100617 B2    3/2008
(Continued)

OTHER PUBLICATIONS

Korean Office Action (KR 10-2017-0073346), KIPO, dated Apr. 13, 2018.

*Primary Examiner* — Kaity V Chandler
(74) *Attorney, Agent, or Firm* — Park & Associates IP Law, P.C.

(57) ABSTRACT

This invention relates to a bipolar plate for a fuel cell having a controlled structure of carbon materials and a method of manufacturing the same, the method including obtaining a masterbatch by mixing a first carbon material powder having a size ranging from 0.1 to 200 μm with a polymer resin, forming a masterbatch powder by crushing the masterbatch, preparing a conductive composition by mixing the masterbatch powder with a second carbon material powder having a size ranging from 300 μm to 1 mm, and manufacturing a bipolar plate by subjecting the conductive composition to compression molding. Thereby, carbon materials in a powder phase having different sizes can be uniformly dispersed via a masterbatch to thus shorten a conductive path, thereby decreasing electrical resistivity, and furthermore, dispersion in the polymer resin can be improved, thereby increasing flexural strength.

7 Claims, 7 Drawing Sheets

(51) Int. Cl.
    *H01M 8/0221* (2016.01)
    *B29C 48/00* (2019.01)
    *B29C 48/40* (2019.01)
    *B29C 43/00* (2006.01)
    *B29K 507/04* (2006.01)
    *B29K 21/00* (2006.01)

(52) U.S. Cl.
    CPC ......... *B29C 48/402* (2019.02); *H01M 8/0213* (2013.01); *H01M 8/0221* (2013.01); *B29K 2021/003* (2013.01); *B29K 2507/04* (2013.01)

(56) References Cited

U.S. PATENT DOCUMENTS

| | | | | |
|---|---|---|---|---|
| 7,758,783 | B2 * | 7/2010 | Shi | B29C 43/222 264/109 |
| 2003/0148164 | A1 * | 8/2003 | Koch | H01M 8/0243 429/535 |
| 2003/0168638 | A1 * | 9/2003 | Butler | C08F 283/01 252/500 |
| 2004/0058214 | A1 * | 3/2004 | Mehler | H01B 1/24 429/518 |
| 2004/0076863 | A1 * | 4/2004 | Baars | C25B 9/04 429/434 |
| 2004/0191608 | A1 * | 9/2004 | Chopra | H01M 8/0213 429/479 |
| 2004/0229993 | A1 * | 11/2004 | Huang | C08K 7/02 524/495 |
| 2006/0084750 | A1 * | 4/2006 | Huang | C08K 7/02 524/495 |
| 2006/0240305 | A1 * | 10/2006 | Huang | H01M 8/0206 429/457 |
| 2007/0111078 | A1 * | 5/2007 | Tanno | H01M 8/0243 429/518 |
| 2007/0154771 | A1 * | 7/2007 | Jang | C08J 5/04 429/514 |
| 2008/0095994 | A1 * | 4/2008 | Jiang | H01M 8/0213 428/212 |
| 2008/0268318 | A1 * | 10/2008 | Jang | H01M 8/0206 429/492 |
| 2008/0279710 | A1 * | 11/2008 | Zhamu | B22F 1/0059 419/6 |
| 2008/0280202 | A1 * | 11/2008 | Yen | H01B 1/24 429/210 |
| 2009/0072448 | A1 * | 3/2009 | Shi | B29C 43/222 264/405 |
| 2009/0151847 | A1 * | 6/2009 | Zhamu | B29C 43/265 156/47 |
| 2011/0129737 | A1 * | 6/2011 | Lee | B32B 38/0004 429/247 |
| 2011/0315934 | A1 * | 12/2011 | Ma | H01B 1/24 252/511 |
| 2016/0064746 | A1 * | 3/2016 | Iino | H01M 4/96 429/468 |
| 2017/0062845 | A1 * | 3/2017 | Li | H01M 8/0243 |

FOREIGN PATENT DOCUMENTS

| | | |
|---|---|---|
| KR | 10-0805989 B1 | 2/2008 |
| KR | 10-2009-0077369 A | 7/2009 |
| KR | 10-1011014 B1 | 1/2011 |

* cited by examiner ately stacked. Such a stack
BIPOLAR PLATE FOR FUEL CELL HAVING CONTROLLED STRUCTURE OF CARBON MATERIALS AND METHOD OF MANUFACTURING THE SAME

REFERENCE TO RELATED APPLICATIONS

This application claims the priority benefit of Korean Patent Application No. 10-2017-0073346 filed on Jun. 12, 2017, the entire contents of which are incorporated herein by reference.

FIELD OF THE INVENTION

The present invention relates to a bipolar plate for a fuel cell having a controlled structure of carbon materials and a method of manufacturing the same, and more particularly to a bipolar plate for a fuel cell having a controlled structure of carbon materials and a method of manufacturing the same, in which carbon materials in a powder phase having different sizes are uniformly dispersed in a polymer matrix via a masterbatch to thus shorten a conductive path, thereby decreasing electrical resistivity and increasing flexural strength.

BACKGROUND OF THE INVENTION

A fuel cell is a power generation system for producing electrical energy through an electrochemical reaction of a hydrogen- or hydrocarbon-based fuel and an oxidizer, typified by oxygen. Since energy is directly obtained through an electrochemical reaction rather than through fuel combustion, high power generation efficiency and less pollution result, and thus, thorough research into the practical application of fuel cells is ongoing. Furthermore, a fuel cell is characterized in that a chemical reactant may be received from the outside to thus continuously generate power even without an additional charging process. The kinds of fuel cells are classified into, depending on the type of electrolyte, solid oxide fuel cells, phosphoric acid fuel cells, polymer electrolyte fuel cells, direct methanol fuel cells, and the like.

A fuel cell is typically configured to include a stack structure in which an electrolyte-electrode composite layer comprising electrodes, a catalyst layer, and a thin-film layer and a bipolar plate are alternately stacked. Such a stack structure includes two bipolar plates having flow channels so as to allow a reactive gas to flow therethrough. The bipolar plates function to supply a hydrogen fuel and oxygen to the electrolyte-electrode composite layer, collect current, and prevent the risk of explosion and combustion from occurring due to direct contact of hydrogen and oxygen, and thus are required to possess low gas permeability and high electrical conductivity. In particular, the bipolar plates are required to exhibit high electrical conductivity, phosphoric acid resistance for withstanding the strong corrosiveness of phosphoric acid, and high thermal conductivity, to thus enable the production of energy using waste heat and exhibit high strength.

Moreover, a fuel cell has the highest efficiency by means of cogeneration technology for producing heat and electricity, and is characterized in that a hydrocarbon-based fuel is reformed into hydrogen and then used, and thus the amount of harmful material from exhaust gas is very low compared to general thermal power generation. A phosphoric acid fuel cell operates at a relatively high temperature under phosphoric acid conditions, and a bipolar plate suitable therefor is required to exhibit high heat resistance and durability and low electrical resistivity.

Such a fuel cell is configured to include a gas-impermeable layer comprising a graphite conductor having a particle size of 0.01~50 μm and a binder and a gas-permeable layer having a flow-channel pattern formed on one or both sides of the gas-impermeable layer and comprising a graphite conductor having a particle size of 100~300 μm and a binder, as disclosed in Korean Patent No. 10-0805989, entitled "Bipolar plate for fuel cell and Stack for fuel cell comprising the same". However, as in the conventional technique, in the case where a bipolar plate is manufactured by compressing only graphite having a large size, phosphoric acid resistance is high but strength is decreased. Hence, in order to make the bipolar plate in the form of a thin film to reduce the weight thereof, low strength and poor thermal conductivity in a vertical direction may result, thus lowering the energy production efficiency using waste heat, which is undesirable. On the other hand, in the case where a bipolar plate is manufactured using graphite having a small size, the graphite is easily stripped and is thus efficiently dispersed in a polymer matrix, thereby enhancing strength, but the graphite particles are not connected to each other, undesirably increasing electrical resistivity.

SUMMARY OF THE INVENTION

Accordingly, the present invention has been made keeping in mind the problems encountered in the related art, and the present invention is intended to provide a bipolar plate for a fuel cell having a controlled structure of carbon materials and a method of manufacturing the same, in which carbon materials in a powder phase having different sizes are uniformly dispersed in a polymer matrix via a masterbatch to thus shorten a conductive path, thereby decreasing electrical resistivity and increasing flexural strength.

Therefore, the present invention provides a method of manufacturing a bipolar plate for a fuel cell having a controlled structure of carbon materials, comprising: obtaining a masterbatch by mixing a first carbon material powder having a size ranging from 0.1 to 200 μm with a polymer resin; forming a masterbatch powder by crushing the masterbatch; preparing a conductive composition by mixing the masterbatch powder with a second carbon material powder having a size ranging from 300 μm to 1 mm; and manufacturing a bipolar plate by subjecting the conductive composition to compression molding.

Preferably, upon obtaining the masterbatch, pre-mixing using ball milling is performed to thus reduce the size of the first carbon material powder and improve mixing thereof with the polymer resin, and the first carbon material powder and the polymer resin are mixed and extruded using a twin-screw extruder and at least two kneading blocks in the twin screw, thereby obtaining a carbon material/polymer masterbatch in a powder phase that is dispersed well in a matrix of the polymer resin. Furthermore, the extrusion is preferably performed at an extruder temperature of 180 to 300° C. per barrel and at a screw rotational speed of 100 to 400 rpm.

Preferably, the masterbatch includes, based on a total of 100 wt % thereof, 10 to 50 wt % of the first carbon material powder and 50 to 90 wt % of the polymer resin, and the conductive composition includes, based on a total of 100 wt % thereof, 70 to 90 wt % of the first carbon material powder and the second carbon material powder, and 10 to 30 wt % of the polymer resin.

In addition, the present invention provides a bipolar plate for a fuel cell having a controlled structure of carbon materials, formed by mixing a first carbon material powder having a size ranging from 0.1 to 200 μm with a polymer resin to form a masterbatch powder, mixing the masterbatch powder with a second carbon material powder having a size ranging from 300 μm to 1 mm to give a conductive composition, and subjecting the conductive composition to compression molding.

According to the construction of the present invention, carbon materials in a powder phase having different sizes can be uniformly dispersed in a polymer matrix via a masterbatch to thus shorten a conductive path, thereby decreasing electrical resistivity and increasing flexural strength.

DETAILED DESCRIPTION OF THE INVENTION

Hereinafter, a detailed description will be given of a bipolar plate for a fuel cell having a controlled structure of carbon materials and a method of manufacturing the same according to embodiments of the present invention with reference to the appended drawings.

Figure 1:
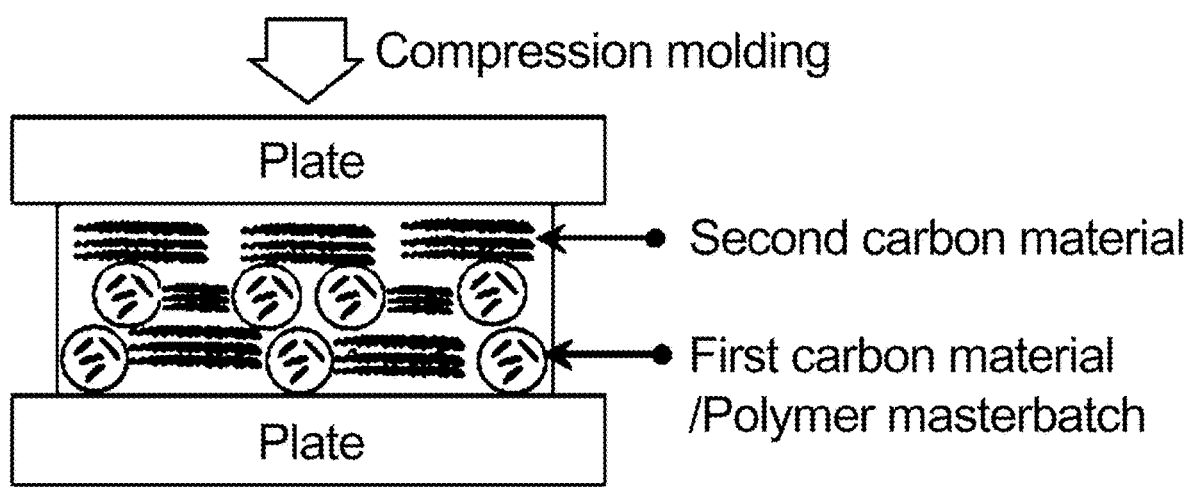
FIGS. 1 and 2 are, respectively, a concept view and a flowchart showing the process of manufacturing a bipolar plate for a fuel cell having a controlled structure of carbon materials according to an embodiment of the present invention.

According to the present invention, a bipolar plate for a fuel cell is formed by mixing a first carbon material powder having a size ranging from 0.1 to 200 μm with a polymer resin to form a masterbatch and mixing the masterbatch with a second carbon material powder having a size ranging from 300 μm to 1 mm to give a conductive composition, which is then subjected to compression molding, as shown in FIG. 1. The bipolar plate preferably has a thickness of 1 to 4 mm, is formed with a flow channel of 0.2 to 4 mm in width, and exhibits electrical resistivity of 100 mΩ·cm or less, but the present invention is not limited thereto.

Figure 2:
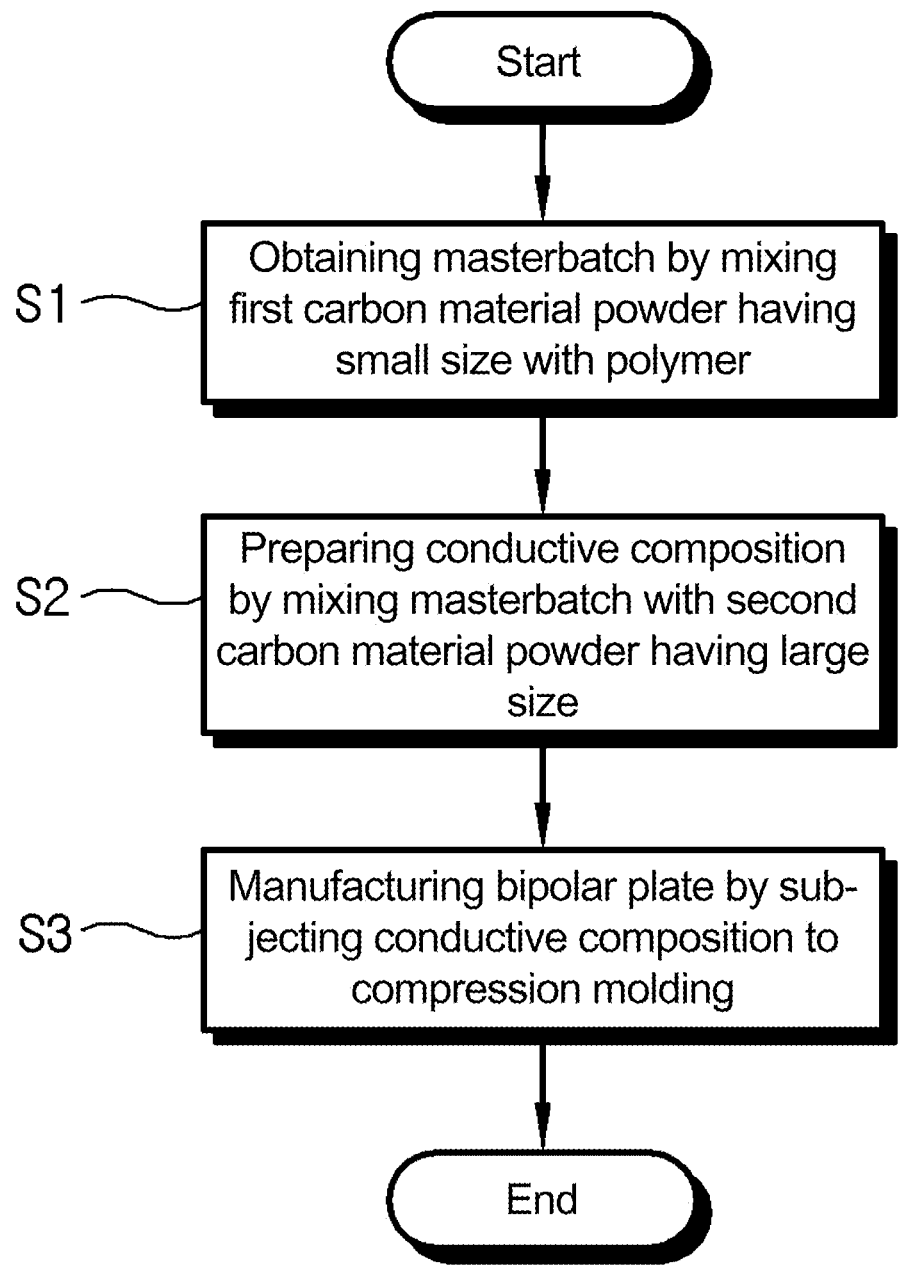

As shown in FIG. 2, in the method of manufacturing the bipolar plate for a fuel cell, a masterbatch is obtained by mixing a first carbon material powder having a small size with a polymer resin (S1).

The first carbon material powder having a small size is a powder having a diameter ranging from 0.1 to 200 μm. Here, a carbon material is preferably selected from the group consisting of graphite, carbon black, carbon nanotubes (CNTs) and mixtures thereof, but the present invention is not limited thereto. If the diameter of the first carbon material powder is less than 0.1 μm, powder particles hardly come into contact with each other, making it difficult to form a conductive path. On the other hand, if the diameter thereof exceeds 200 μm, the size thereof is not different from the size of the second carbon material powder having a large size, thus causing the same problems as in bipolar plates comprising only carbon powder having a large size. Explained in brief, dispersion in the polymer resin does not efficiently occur, undesirably increasing electrical resistivity and decreasing flexural strength.

Also, the polymer resin is preferably selected from the group consisting of high-heat-resistant polymers, such as polyacrylate, polysulfone, polyethersulfone, polyphenylene sulfide, polyether ether ketone, polyimide, polyetherimide, a fluorocarbon polymer, a liquid crystal polymer, polyvinylidene fluoride, polytetrafluoroethylene (PTFE), perfluoroalkoxy (PFA), fluorinated ethylene-propylene (FEP) and mixtures thereof. Furthermore, the polymer resin preferably has a particle size of 1 to 200 μm. If the particle size thereof is less than 1 μm, it is difficult to form polymer resin particles. On the other hand, if the particle size thereof exceeds 200 μm, uniform mixing thereof with the first carbon material powder becomes difficult.

The masterbatch preferably includes, based on 100 wt % thereof, 10 to 50 wt % of the first carbon material powder and 50 to 90 wt % of the polymer resin. If the amount of the first carbon material powder is less than 10 wt %, electrical resistivity may remarkably increase. On the other hand, if the amount of the first carbon material powder exceeds 50 wt %, the amount of the polymer resin is relatively decreased, undesirably deteriorating processability, and thus the uniformity of electrical resistivity of a product after compression molding decreases. This problem also equally applies to the amount of the polymer resin. If the amount of the polymer resin is less than 50 wt %, processability of the bipolar plate becomes poor. On the other hand, if the amount thereof exceeds 90 wt %, the amount of the first carbon material powder is decreased, undesirably increasing electrical resistivity.

In the preparation of the masterbatch using the first carbon material powder and the polymer resin, pre-mixing is performed through ball milling such that the first carbon material powder has a size of 0.1 to 200 μm, thus reducing the size of the first carbon material powder and improving mixing thereof with the polymer resin, and the first carbon material powder and the polymer resin are mixed and extruded using a twin-screw extruder for applying high shear stress using a combination of at least two kneading block screws, thereby preparing a carbon material/polymer masterbatch that is dispersed well in a polymer matrix. Here, the extrusion process is preferably carried out under conditions of an extruder temperature of 180 to 300° C. per barrel and a screw rotational speed of 100 to 400 rpm, but the present invention is not limited thereto.

A masterbatch powder is formed by crushing the masterbatch (S2).

Figure 3:
FIG. 3 is a photograph showing extruded masterbatch pellets.

The masterbatch prepared in S1 is present in the form of a thick pellet, as shown in FIG. 3, but a bipolar plate cannot be directly manufactured therefrom. Hence, the masterbatch is crushed, thus forming a masterbatch powder. The masterbatch powder is present in the state in which the first carbon material and the polymer resin are uniformly mixed together. The crushing process is preferably performed using a crusher, and the powderization of the masterbatch may be carried out using a crusher (PC-6.5-F, Sung Chang Machinery) or through attrition milling after immersion of the pellets in liquid nitrogen.

A conductive composition is prepared by mixing the masterbatch powder with the second carbon material powder having a large size (S3).

The second carbon material powder having a size ranging from 300 µm to 1 mm is mixed with the masterbatch powder prepared in S2 to give a conductive composition. The second carbon material powder is larger than the first carbon material powder, and when the mixture of the first carbon material powder and the second carbon material powder is applied to the manufacture of the bipolar plate, the resulting bipolar plate has superior properties. Like the first carbon material powder, the second carbon material powder is preferably selected from the group consisting of graphite, carbon black, carbon nanotubes (CNTs) and mixtures thereof, but is not limited thereto.

In the case where the first carbon material powder and the second carbon material powder are not provided in the form of a masterbatch but are directly mixed with each other, these are not uniformly dispersed, but agglomerate, and are thus spaced apart from surrounding powder particles, undesirably increasing electrical resistivity and deteriorating strength. With the goal of overcoming such problems, in the present invention, the first carbon material powder is mixed with the polymer resin to give a masterbatch powder, which is then mixed with the second carbon material powder, whereby the second carbon material powder may be uniformly dispersed without agglomeration in the polymer resin.

The second carbon material powder, in an amount adjusted such that the amount of the carbon material powder is 60 to 90 wt % based on 100 wt % of the conductive composition thus obtained, is mixed with the masterbatch powder. If the amount of the carbon material powder contained in the conductive composition is less than 60 wt %, electrical resistivity may increase. On the other hand, if the amount thereof exceeds 90 wt %, the shape of the bipolar plate cannot be maintained, and flexural strength may decrease. Depending on the amount of the carbon material powder, the amount of the polymer resin is preferably set to the range of 10 to 40 wt %. As necessary, the conductive composition may comprise, based on 100 wt % thereof, 30 to 50 wt % of the masterbatch and 30 to 50 wt % of the second carbon material powder.

A bipolar plate is manufactured by subjecting the conductive composition to compression molding (S4).

The conductive composition prepared in S3 is loaded in a hexahedral mold corresponding to the size of the bipolar plate, after which the conductive composition is subjected to compression molding using a compression molding machine, thus manufacturing a bipolar plate. Here, compression molding is performed in a manner in which the temperature is elevated to 360° C. and then maintained for 1 hr, thereby manufacturing a bipolar plate. The bipolar plate of the present invention, manufactured through structural control of the carbon materials in a powder phase, is remarkably decreased in electrical resistivity and is enhanced in flexural strength, compared to conventional bipolar plates obtained through a mixing process. This is because the carbon material powder is dispersed in the polymer matrix to thus facilitate the structural control thereof, thereby improving electrical conductivity and flexural strength.

The ultimately manufactured bipolar plate has a thickness of 1 to 4 mm, is formed with a flow channel of 0.2 to 4 mm in width, and exhibits electrical resistivity of 100 mΩ·cm or less. Accordingly, the bipolar plate of the invention may be formed to a size similar to that of a commercially available bipolar plate having a thickness of 3 to 4 mm and a flow channel of 0.75 mm in width.

A better understanding of the present invention will be give through the following examples.

Comparative Example 1

According to a conventional technique, graphite (#3763, Asbury) of 500 µm, which is a large size, was mixed with a fluorinated ethylene-propylene polymer resin (particle size=5 µm, FEP, 6322PZ, 3M) depending on the amount of graphite, and a composition for a fuel cell bipolar plate was prepared under conditions of a temperature of 360° C., a pressure of 200 kg/cm$^2$ and a holding time of 1 hr using a compression molding machine (Model No.: WPHP10T, made by IIShin Autoclave). The results of electrical resistivity and density depending on changes in the amounts of graphite and fluorinated ethylene-propylene polymer resin are shown in Table 1 below.

TABLE 1

| | Fluorinated ethylene-propylene:Graphite (wt %) | | | | |
|---|---|---|---|---|---|
| | 10:90 | 15:85 | 20:80 | 25:75 | 30:70 |
| Electrical resistivity (mΩ · cm) | 4.475 | 5.740 | 13.023 | 31.027 | 40.293 |
| Density (g/cm$^3$) | 2.29 | 2.24 | 2.22 | 2.21 | 2.19 |

As is apparent from Table 1, as the amount of the fluorinated ethylene-propylene polymer resin increases, electrical resistivity may increase and density may decrease due to an increase in the insulator polymer resin. When the amount of graphite is 20 wt %, the numerical value of electrical resistivity can be confirmed to be suitable for use in a bipolar plate for a high-temperature corrosion-resistant fuel cell. However, in the case where the amount of the fluorinated ethylene-propylene polymer resin is 15 wt % or less, processability becomes poor, and thus the uniformity of electrical resistivity of the product after compression molding is observed to decrease. In order to reduce the thickness and weight of the bipolar plate, electrical conductivity and flexural strength need to be improved through changes in the structure of a carbon composite at the same graphite content.

EXAMPLE

According to the present invention, 25 g of a graphite powder (Micrograf99835HP, Nacional de Grafite Ltda.) of 35 µm, which is a small size, and 75 g of a fluorinated ethylene-propylene polymer resin were weighed and then subjected to ball milling (DAIHAN Scientific, Model No.: BML-2) for 6 hr. The powder mixture thus obtained was extruded using an extruder to yield a masterbatch having a graphite content of 25 wt %. Here, the extrusion process was performed under conditions of an extruder temperature of 180 to 300° C. per barrel and a screw rotational speed of 100 rpm. The masterbatch thus extruded was formed into a masterbatch powder using a crusher. The extruded masterbatch powder is shown in the optical microscope image of FIG. 3.

Figure 4:
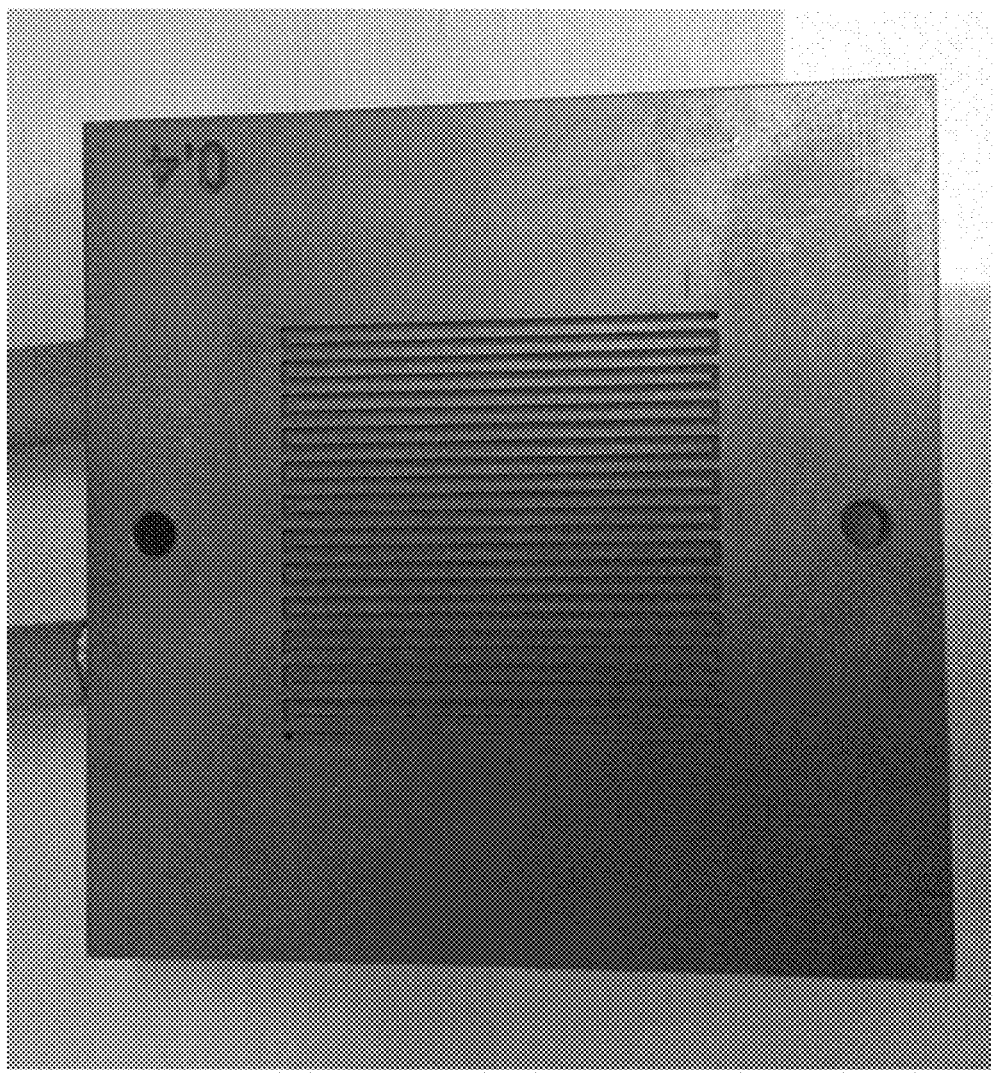
FIG. 4 is a photograph showing the manufactured bipolar plate.

Next, 275 g of a graphite powder of 500 μm, which is a large size, was further mixed with the masterbatch powder. As such, the total amount of graphite was adjusted to 80 wt %. The prepared powder was loaded in a hexahedral mold and was then subjected to compression molding using a compression molding machine, thus manufacturing a bipolar plate. Here, the compression molding for manufacturing a bipolar plate was performed in a manner in which the temperature was elevated to 360° C. and then maintained for 1 hr. As shown in FIG. 4, the manufactured bipolar plate had a size of 60×60 mm, with a flow channel of 1 mm in width formed using MCT (FANUC ROBODRILL, Model No.: α-D211_iA5).

Figure 5:
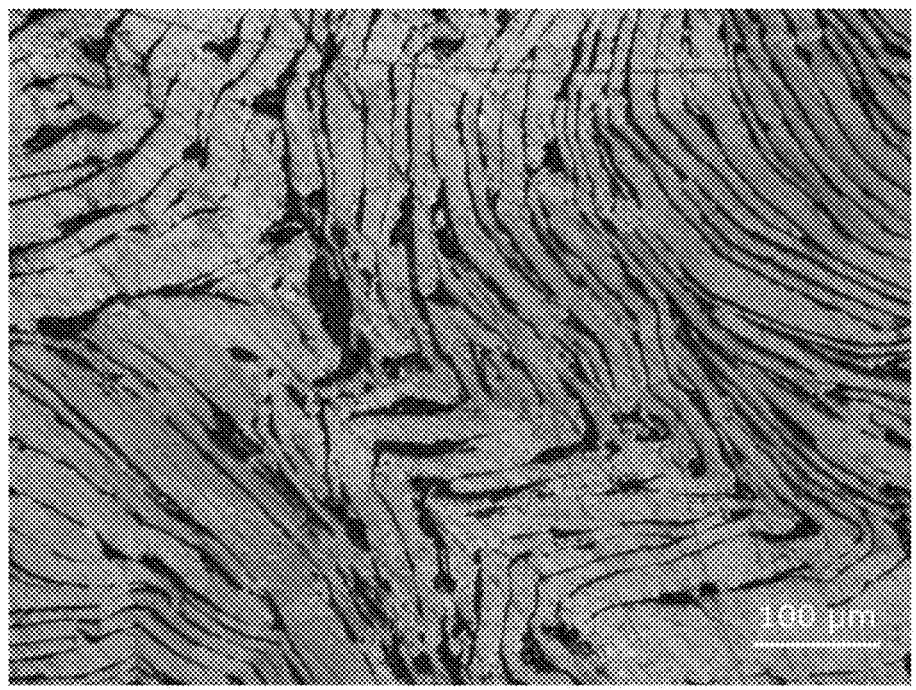
FIG. 5 is an optical microscope image showing the fracture surface of the bipolar plate of Example.

The optical microscope image of the manufactured bipolar plate is shown in FIG. 5, in which the fracture surface of the bipolar plate is polished and then observed. Actually, the small graphite is efficiently dispersed in the polymer matrix and is thus difficult to observe using an optical microscope, and the large graphite can be confirmed to be uniformly dispersed in the polymer resin.

Comparative Example 2

Both of a graphite powder (Micrograf99835HP, Nacional deGrafite Ltda.) of 35 μm, which is a small size, and a graphite powder of 500 μm, which is a large size, were mixed together with a fluorinated ethylene-propylene polymer resin, in lieu of being respectively mixed with the polymer resin, followed by compression molding, thus manufacturing a bipolar plate. Here, the total amount of graphite was adjusted to 80 wt %.

Figure 6:
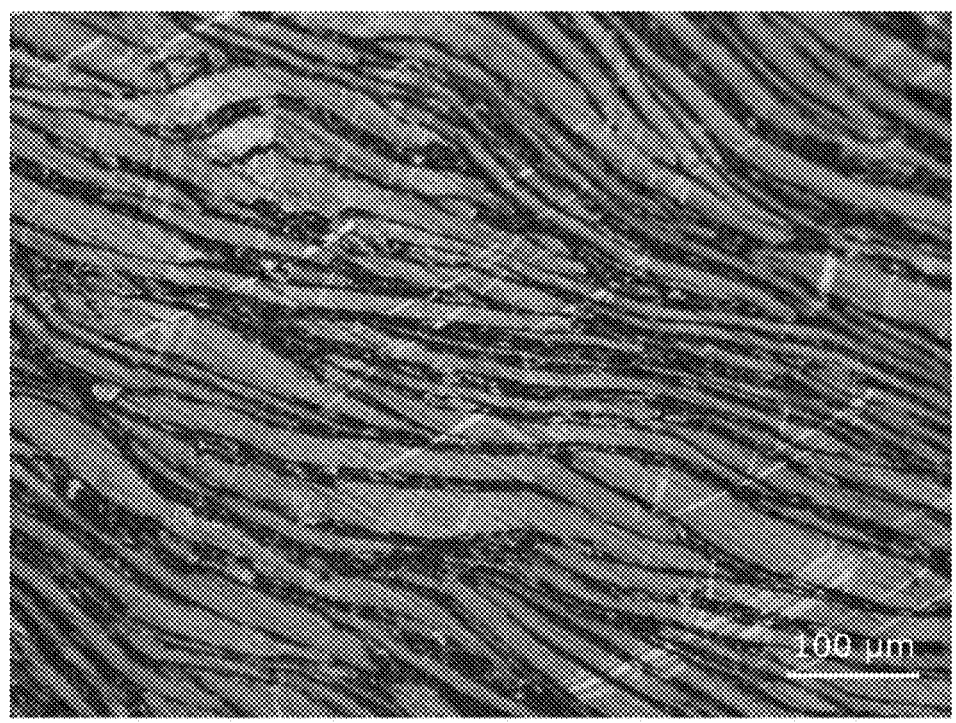
FIG. 6 is an optical microscope image showing the fracture surface of the bipolar plate of Comparative Example 2.

FIG. 6 is an optical microscope image showing the fracture surface of the bipolar plate, in which the graphite powder is not uniformly dispersed in the polymer matrix but is agglomerated. The graphite powder is present in an agglomerated form and is not uniformly dispersed, and thus becomes difficult to connect to surrounding graphite powder, whereby the path for electrical conduction is lengthened, ultimately increasing resistance and deteriorating the flexural strength of the bipolar plate.

Comparative Example 3

Figure 7:
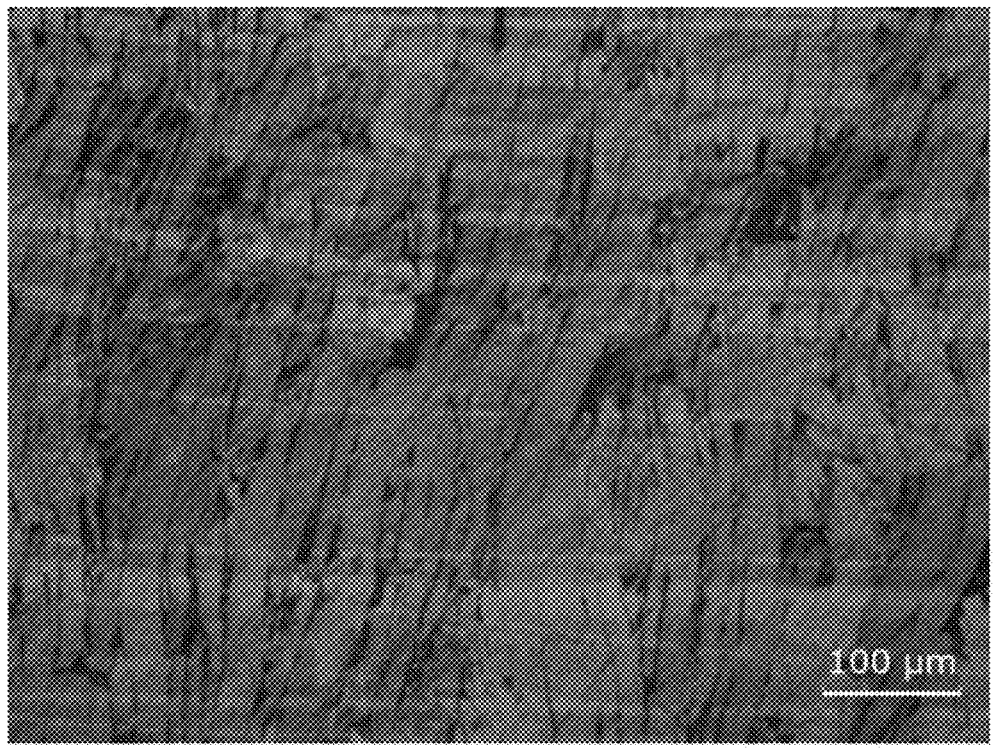
FIG. 7 is an optical microscope image showing the fracture surface of the bipolar plate of Comparative Example 3.

A bipolar plate was manufactured using only a graphite powder (#3763, Asbury) of 500 μm, which is a large size. Specifically, 300 g of the large graphite powder and 60 g of a fluorinated ethylene-propylene polymer resin were weighed and mixed together. The mixture of graphite powder and polymer resin was subjected to compression molding, thus manufacturing a bipolar plate. In the bipolar plate as shown in the optical microscope image of FIG. 7, when only the large graphite powder is contained, the incidence of defects of graphite powder is decreased and an electrically conductive path is shortened, thus lowering electrical resistivity but deteriorating flexural strength.

Comparative Example 4

Figure 8:
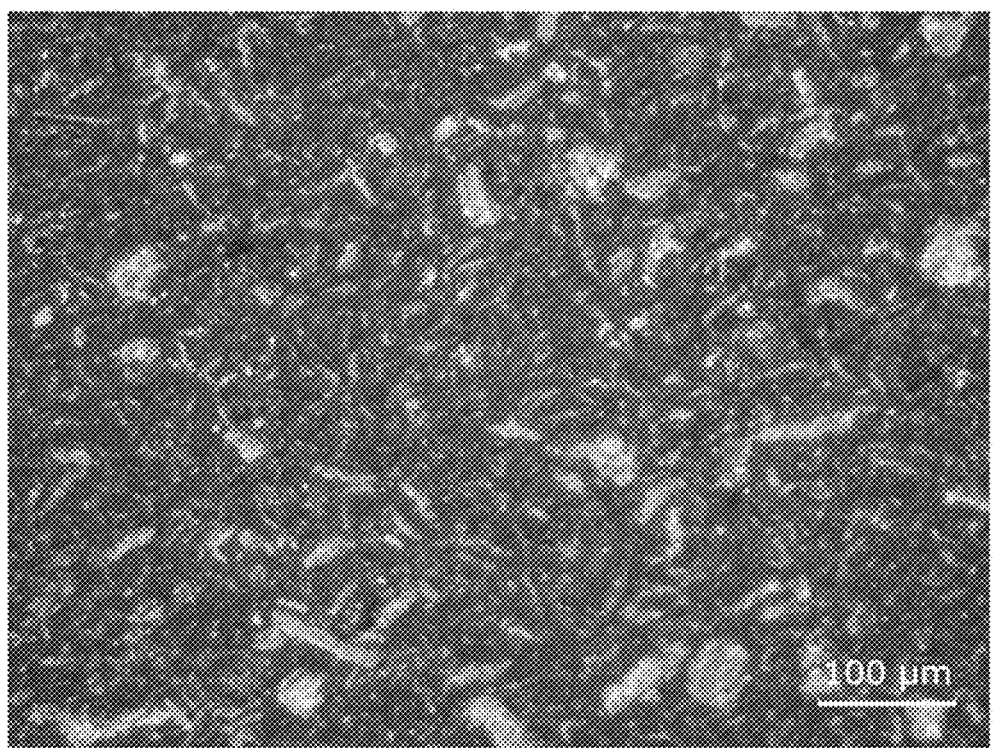
FIG. 8 is an optical microscope image showing the fracture surface of the bipolar plate of Comparative Example 4.

A bipolar plate was manufactured using only a graphite powder (Micrograf99835HP, Nacional deGrafite Ltda.) of 35 μm, which is a small size. Specifically, 300 g of the small graphite powder and 60 g of a fluorinated ethylene-propylene polymer resin were weighed and mixed together. The mixture of graphite powder and polymer resin was subjected to compression molding, thus manufacturing a bipolar plate. In the bipolar plate as shown in the optical microscope image of FIG. 8, when only the small graphite powder is present, it is efficiently dispersed in the polymer matrix to thus increase flexural strength, but an electrically conductive path is lengthened, undesirably increasing electrical resistivity.

TABLE 2

|  | Electrical resistivity (mΩ · cm) | Flexural strength (MPa) |
| --- | --- | --- |
| Example | 1.505 | 10.7 |
| Comparative Example 2 | 50.284 | 9.6 |
| Comparative Example 3 | 13.023 | 8.9 |
| Comparative Example 4 | 26.750 | 16.4 |

Figure 9:
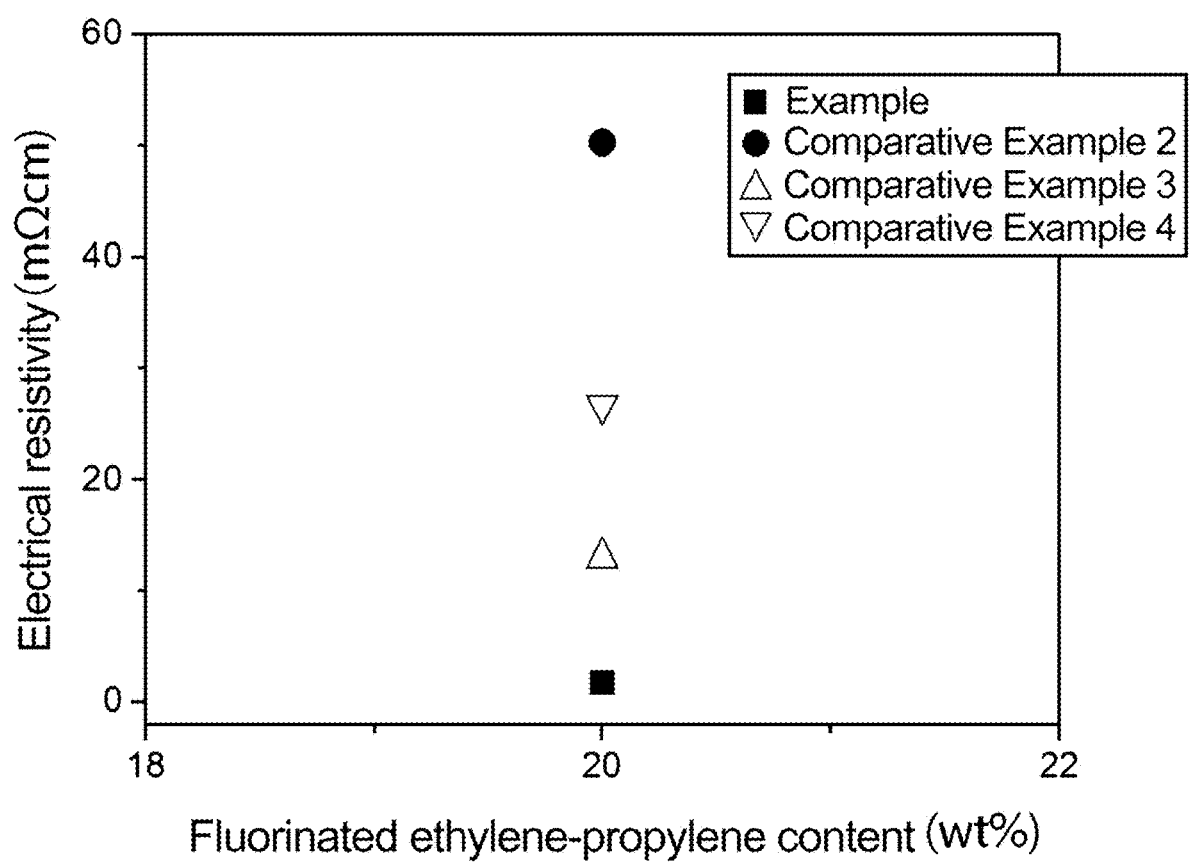
FIG. 9 is a graph showing the results of electrical resistivity of the bipolar plates of Example and Comparative Examples.

Table 2 shows the results of electrical resistivity and flexural strength of the bipolar plates manufactured in Example and Comparative Examples 2 to 4. FIG. 9 is a graph showing the results of electrical resistivity of Example and Comparative Examples 2 to 4. In Example, the small graphite powder and the large graphite powder are mixed, and are present in a state of being uniformly dispersed via the masterbatch formed using the extrusion process. Since the bipolar plate is manufactured using the same in Example, low electrical resistivity and superior flexural strength may result. In contrast, in Comparative Example 2, the masterbatch formed using the extrusion process was not used, and the small graphite powder and the large graphite powder were directly mixed, and in Comparative Example 3, only the large graphite powder was mixed, and in Comparative Example 4, only the small graphite powder was mixed. Comparative Examples 2 to 4 were drastically increased in electrical resistivity compared to Example.

The flexural strength of Example was lower than that of Comparative Example 4, higher than that of Comparative Example 3, and similar to that of Comparative Example 2. The electrical resistivity and flexural strength of Example correspond to a level that enables the commercialization of a bipolar plate. Here, electrical resistivity was measured in accordance with ASTM D991 using a resistance meter (made by Mitsubishi, Model No.: MCP-T610), ESP was used as the test probe, and the middle portion of the sample (50×50×2 mm, width, length, thickness) was measured at an applied voltage of 10 V. Also, the flexural strength of the processed sample (12.7×5.6×4.8 mm, width, length, thickness) was measured at a rate of 10 mm/min using a universal testing machine (UTM, made by DA-WHA, DEC-M200KC), at least five samples were measured, and the measured values were averaged.

The conventional manufacture of a bipolar plate using carbon material powder has the following problems. 1) In the case where a bipolar plate is manufactured using only a carbon material powder having a large size, the incidence of defects of carbon material powder is decreased and an electrically conductive path is shortened to thus lower electrical resistivity, but flexural strength is deteriorated. 2) In a bipolar plate manufactured using only a carbon material powder having a small size, the carbon material powder is efficiently dispersed in a polymer matrix, and thus flexural strength is improved, but interparticle connection of the carbon material powder does not readily occur, thus increasing electrical resistivity. 3) In the case where a bipolar plate is manufactured by directly mixing a carbon material powder having a large size and a carbon material powder having a small size, the powder particles are severely agglomerated, and thus the effects resulting from the addition of carbon material powder particles having different sizes cannot be exhibited. However, in the present invention, carbon materials in a powder phase having different sizes are uniformly dispersed in a polymer matrix via a masterbatch, thus shortening the electrically conductive path to thereby decrease electrical resistivity and increase flexural strength.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of manufacturing a bipolar plate for a fuel cell having a controlled structure of carbon materials, comprising:
    obtaining a masterbatch by mixing a first carbon material powder having a size ranging from 0.1 to 200 µm with a polymer resin;
    forming a masterbatch powder by crushing the masterbatch;
    preparing a conductive composition by mixing the masterbatch powder with a second carbon material powder having a size ranging from 300 µm to 1 mm; and
    manufacturing a bipolar plate by subjecting the conductive composition to compression molding.

2. The method of claim 1, wherein upon the obtaining the masterbatch, pre-mixing using milling is performed to thus reduce the size of the first carbon material powder and improve mixing thereof with the polymer resin, and the first carbon material powder and the polymer resin are mixed and extruded using a twin-screw extruder, thereby obtaining a carbon material/polymer masterbatch in a powder phase that is dispersed well in a matrix of the polymer resin.

3. The method of claim 2, wherein an extrusion process is performed at an extruder temperature of 180 to 300° C. per barrel and at a screw rotational speed of 100 to 300 rpm using at least two kneading blocks in the twin screw.

4. The method of claim 1, wherein the masterbatch includes, based on a total of 100 wt % thereof, 10 to 50 wt % of the first carbon material powder and 50 to 90 wt % of the polymer resin, and
    the conductive composition includes, based on a total of 100 wt % thereof, 60 to 90 wt % of the first carbon material powder and the second carbon material powder and 10 to 40 wt % of the polymer resin.

5. The method of claim 1, wherein the polymer resin has a particle size of 1 to 200 µm.

6. The method of claim 1, wherein the polymer resin is selected from the group consisting of high-heat-resistant polymers, including polyacrylate, polysulfone, polyethersulfone, polyphenylene sulfide, polyether ether ketone, polyimide, polyetherimide, a fluorocarbon polymer, a liquid crystal polymer, polyvinylidene fluoride, polytetrafluoroethylene (PTFE), perfluoroalkoxy (PFA), fluorinated ethylene-propylene (FEP) and mixtures thereof.

7. The method of claim 1, wherein the first carbon material or the second carbon material is selected from the group consisting of graphite, carbon black, carbon nanotubes (CNTs) and mixtures thereof.

* * * * *